United States Patent
Lee (10) Patent No.: US 10,754,857 B2
(45) Date of Patent: Aug. 25, 2020

(54) DATABASE SYSTEM BASED ON JIT COMPILATION, QUERY PROCESSING METHOD THEREOF, AND STORED PROCEDURE OPTIMIZATION METHOD THEREOF

(71) Applicant: ELECTRONICS AND TELECOMMUNICATIONS RESEARCH INSTITUTE, Daejeon (KR)

(72) Inventor: Myung Cheol Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 189 days.

(21) Appl. No.: 16/112,204

(22) Filed: Aug. 24, 2018

(65) Prior Publication Data
US 2019/0220535 A1 Jul. 18, 2019

(30) Foreign Application Priority Data
Jan. 18, 2018 (KR) .......................... 10-2018-0006721

(51) Int. Cl.
*G06F 16/2453* (2019.01)
*G06F 16/28* (2019.01)
*G06F 16/242* (2019.01)

(52) U.S. Cl.
CPC .... *G06F 16/24542* (2019.01); *G06F 16/2433* (2019.01); *G06F 16/283* (2019.01)

(58) Field of Classification Search
CPC ................................................ G06F 16/24542
See application file for complete search history.

(56) References Cited

U.S. PATENT DOCUMENTS

| 7,392,259 B2 | 6/2008 | Lee et al. |
| 8,515,944 B2 | 8/2013 | Kim et al. |
| 8,996,503 B2 | 3/2015 | Schneider et al. |
| 2016/0034529 A1 | 2/2016 | Nguyen et al. |
| 2017/0091269 A1* | 3/2017 | Zhu .................. G06F 16/24542 |

OTHER PUBLICATIONS

Craig Freedman et al., "Compilation in the Microsoft SQL Server Hekaton Engine", Bulletin of the IEEE Computer Society Technical Committee on Data Engineering, 37 (1), Mar. 2014, pp. 22-30.

* cited by examiner

*Primary Examiner* — Etienne P Leroux
(74) *Attorney, Agent, or Firm* — Rabin & Berdo, P.C.

(57) ABSTRACT

A database system based on just-in-time (JIT) compilation performs a branch optimization and a loop optimization on the stored procedure. An interpreted query processor generating a structured query language (SQL) execution plan regarding an input online transaction processing (OLTP) query, an online analytical processing (OLAP) analysis, and a stored procedure. A JIT-based query processor receives the SQL execution plan, optimizes a branch and a loop in the received SQL execution plan, and then generates an optimized JIT execution plan. The JIT-based query processor generates a query processing executor performing query processing based on the JIT execution plan and provides a result of the query processing performed by the query processing executor.

20 Claims, 5 Drawing Sheets

DATABASE SYSTEM BASED ON JIT COMPILATION, QUERY PROCESSING METHOD THEREOF, AND STORED PROCEDURE OPTIMIZATION METHOD THEREOF

CROSS REFERENCE TO RELATED APPLICATION

The present application claims priority to Korean Patent Application Number 10-2018-0006721, filed on Jan. 18, 2018, the entire contents of which are incorporated herein for all purposes by this reference.

BACKGROUND

Field

The present disclosure relates, in general, to query optimization in a database field, and more particularly, to stored procedure optimization in a database system, intended to efficiently support online analysis workload using a stored procedure.

Description

In the Volcano model, known as the Iterator model, a precompiled interpreter model-based query executor performs structured query language (SQL) query processing by visiting each node and processing a corresponding operator while traversing an execution plan tree generated from the SQL query in a top-down manner. The query executor repeats generating a single result tuple every time and sending the result in a bottom-up manner until a sufficient result is obtained.

Even in the case that the up-to-date high parallel hardware (HW) is used, the interpreter model-based query processing has limited performance, which is problematic.

Thus, the up-to-date database systems, such as HIQUE, HyPer, MonetDB, Hekaton, Impala, and LegoBase, use compiler optimization, i.e. just-in-time (JIT) compiled SQL optimization.

Although execution of the JIT compilation improves the performance of the compiled query executor, more time JIT compilation may be used, which is problematic. It is therefore known that the JIT compilation is only suitable for an online analytic processing (OLAP) analysis and a stored procedure. The OLAP is characterized by executing analysis by accessing most records and thus taking a long execution time. In the stored procedure, a compilation time is not important, since the stored procedure is repeatedly performed when compiled one time.

The stored procedure is a function provided by a database system, designed to prestore SQL statements, which are frequently and repeatedly used, and repeatedly execute the prestored SQL statements several times in order to reduce costs consumed in every SQL statement processing, such as every SQL statement parsing.

The stored procedure can typically express more complicated logics or algorithms than general SQL statements by additionally providing a plurality of procedural statements and a plurality of overlappable control statements (branches/loops), which are not provided in the case of general SQL statements.

As described above, the stored procedure is characterized by a longer execution time than in the case of general SQL statements. Accordingly, there is a demand for a method for reducing a stored procedure execution time in a database system by providing JIT compiled optimization for the characteristics of the stored procedure, more particularly, branches and loops, i.e. a control flow, which has a significant effect on the execution time.

BRIEF SUMMARY

Various aspects of the present disclosure provide a database system based on just-in-time (JIT) compilation, a query processing method thereof, and a stored procedure optimization method thereof, in which the database system supporting query optimization based on JIT compilation can reduce a stored procedure execution time by overcoming a problem in which a prolonged period of time is spent for processing branches and loops of a stored procedure, so that real-time analysis and immediate decisions can be supported.

According to an exemplary embodiment, a database system based on JIT compilation may include: a storage manager managing data stored in a storage and providing data in response to a request; an interpreted query processor generating a structured query language (SQL) execution plan regarding an input online transaction processing (OLTP) query, an online analytical processing (OLAP) analysis, and a stored procedure; and a JIT-based query processor receiving the SQL execution plan, optimizing a branch and a loop in the received SQL execution plan, and then generating an optimized JIT execution plan. The JIT-based query processor generates a query processing executor performing query processing based on the JIT execution plan and provides a result of the query processing performed by the query processing executor.

The JIT-based query processor may include: a query determination module determining whether or not the SQL execution plan is a query subjected to JIT compilation by analyzing the SQL execution plan; a branch optimization module optimizing the branch in the SQL execution plan; a JIT execution plan generating module generating the JIT execution plan by converting the SQL execution plan; a loop optimization module optimizing the loop in the input JIT execution plan; an optimization rule storage module storing optimization rules used by the branch optimization module and the loop optimization module to execute the optimization; and a query processing control module providing the SQL execution plan, received from the interpreted query processor, to the query determination module, receiving the JIT execution plan from the loop optimization module, and performing query processing to the received JIT execution plan.

The query determination module may determine whether the SQL execution plan is an OLTP query or an OLTP analysis by performing a query workload analysis to the SQL execution plan and, when the SQL execution plan is the OLTP analysis, determines the SQL execution plan to be the query subjected to the JIT compilation.

The query determination module may determine the SQL execution plan to be the OLAP analysis when both an analysis function and an aggregate function are used.

When none, or one, of the analysis function and the aggregate function is used, the query determination module may predict query selectivity and determine the SQL execution plan to be the OLAP analysis when the query selectivity does not exceed a threshold value.

The query processing control module may provide the SQL execution plan to the branch optimization module when the query determination module determines the SQL execution plan to be the query subjected to the JIT compilation and request that the interpreted query processor performs interpreted query processing to the SQL execution plan when the query determination module determines the SQL execution plan to not be the query subjected to the JIT compilation.

The query processing control module may provide the branch-optimized SQL execution plan, received from the branch optimization module, to the JIT execution plan generating module, provides the JIT execution plan, received from the JIT execution plan generating module, to the loop optimization module, and when the loop-optimized JIT execution plan is received from the loop optimization module, generates the query processing executor.

The branch optimization module may perform: constructing a basic data structure, based on which branch optimization is determined to be applicable or not; determining whether or not the branch optimization is applicable by analyzing the SQL execution plan; when the branch optimization is determined to be applicable, constructing branch part information, based on which the branch optimization is applied; executing the branch optimization based on the branch part information; and adjusting a variable name and a reference position, in consideration of original positions and moved positions of instructions, which are moved as a result of the execution of the branch optimization.

The branch optimization module may execute the optimization by constructing a branch part in every branch block, for every bundle of duplicate instructions and every bundle of unique instructions in the branch block, categorizing a type of the branch part, and moving the duplicate operators and the unique operators to a head or a tail, depending on the type of the branch part or a position thereof with respect to another branch part.

The loop optimization module may perform: determining whether or not the loop in the JIT execution plan is a loop, to which loop optimization rules are applicable; when the loop optimization rules are applicable to the loop, extracting a repetition condition variable from the loop; extracting a repetition function for parallel iteration from the loop; generating a parallel loop scheduler in charge of scheduling control over the extracted repetition function; and arranging the extracted repetition functions to be processable in parallel using the parallel loop scheduler.

When the loop is a simple loop, a loop having inter-iteration dependency, a loop including an update, or a loop including a lower-level loop, the loop optimization module may determine the loop in the JIT execution plan to not be subjected to the optimization. When the loop is a loop without inter-iteration dependency, a loop without an update, or a loop without a lower-level loop, the loop optimization module may determine the loop in the JIT execution plan to be subjected to the optimization.

The loop optimization module may extract update instruction information by examining a repetition condition variable about an instruction between a BARRIER statement and a LEAVE statement and extract update instruction information by examining a repetition condition variable about an instruction between the LEAVE statement and a REDO statement.

The loop optimization module may extract a checkLoopCond( ) function, a checkLeaveCond( ) function, a checkRedoCond( ) function, a processPartition( ) function, and a preparePartition( ) function, which are threadable.

According to another exemplary embodiment, a query processing method of a database system based on JIT compilation may include generating a SQL execution plan regarding an input OLTP query, an OLAP analysis, and a stored procedure; determining whether or not the SQL execution plan is subjected to compilation into a JIT execution plan; when the SQL execution plan is determined to not be subjected to the compilation into the JIT execution plan, performing interpreted query processing and providing a result of the interpreted query processing; when the SQL execution plan is determined to be subjected to the compilation into the JIT execution plan, optimizing a branch when the branch is determined to be present in the SQL execution plan; when the branch is determined to not be present in the SQL execution plan, converting the SQL execution plan into a JIT execution plan, and when the branch is optimized, converting the branch-optimized SQL execution plan into the JIT execution plan; when a loop is present in the JIT execution plan, optimizing the loop; generating a query processing executor performing query processing based on the JIT execution plan when the loop is absent in the JIT execution plan and performing query processing based on the loop-optimized JIT execution plan when the loop is optimized; and performing JIT-based query processing by converting the JIT execution plan or the loop-optimized JIT execution plan into machine codes using the query processing executor and providing a result of the JIT-based query processing.

Determining whether or not the SQL execution plan is subjected to the compilation into the JIT execution plan may include determining whether or not the SQL execution plan is the OLTP query or the OLAP analysis and, when the SQL execution plan is the OLAP analysis, determining SQL execution plan to be subjected to the compilation into the JIT execution plan.

Optimizing the branch may include: constructing a basic data structure, based on which branch optimization is determined to be applicable or not; determining whether or not the branch optimization is applicable by analyzing the SQL execution plan; when the branch optimization is determined to be applicable, constructing branch part information, based on which the branch optimization is applied; executing the branch optimization based on the branch part information; and adjusting a variable name and a reference position, in consideration of original positions and moved positions of instructions, which are moved as a result of the execution of the branch optimization.

Optimizing the loop may include: determining whether or not the loop in the JIT execution plan is a loop, to which loop optimization rules are applicable; when the loop optimization rules are applicable to the loop, extracting a repetition condition variable from the loop; extracting a repetition function for parallel iteration from the loop; generating a parallel loop scheduler in charge of scheduling control over the extracted repetition function; and arranging the extracted repetition functions to be processable in parallel using the parallel loop scheduler.

According to another exemplary embodiment, a stored procedure optimization method of a database system based on JIT compilation may include: optimizing a branch in a SQL execution plan generated by processing of an input OLTP query, an OLAP analysis, and a stored procedure; converting the branch-optimized SQL execution plan into a JIT execution plan; optimizing a loop in the JIT execution plan; and performing query processing by converting the loop-optimized JIT execution plan into machine codes.

Optimizing the branch in the SQL execution plan may include: constructing a basic data structure, based on which branch optimization is determined to be applicable or not; determining whether or not the branch optimization is applicable by analyzing the SQL execution plan; when the branch optimization is determined to be applicable, constructing branch part information, based on which the branch optimization is applied; executing the branch optimization based on the branch part information; and adjusting a variable name and a reference position, in consideration of original positions and moved positions of instructions, which are moved as a result of the execution of the branch optimization.

Optimizing the loop in the JIT execution plan may include: determining whether or not the loop in the JIT execution plan is a loop, to which loop optimization rules are applicable; when the loop optimization rules are applicable to the loop, extracting a repetition condition variable from the loop; extracting a repetition function for parallel iteration from the loop; generating a parallel loop scheduler in charge of scheduling control over the extracted repetition function; and arranging the extracted repetition functions to be processable in parallel using the parallel loop scheduler.

Due to the stored procedure optimization based on JIT compilation, according to exemplary embodiments, the database system for efficiently supporting online analysis queries using a stored procedure can optimize a control flow including branches and loops of a stored procedure and then JIT-compile the control flow into machine codes, so that the performance of online analysis can be improved.

DETAILED DESCRIPTION

Structural or functional descriptions regarding embodiments of the present disclosure are provided by way of example to explain the present disclosure. Exemplary embodiments may be implemented in a variety of forms and should not be understood as being limited to those described herein.

Reference will now be made in detail to various embodiments of the present disclosure, specific examples of which are illustrated in the accompanying drawings and described hereinafter, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although terms, such as "first" and "second," may be used herein to describe various elements, these elements should not be limited by these terms. These terms are only used to distinguish one element from another element. For instance, a first element discussed below could be termed a second element without departing from the teachings of the present disclosure. Similarly, a second element could also be termed a first element.

It will be understood that when an element is referred to as being "coupled" or "connected" to other elements, it can be directly coupled or connected to the other elements or intervening elements may be present therebetween. In contrast, it should be understood that when an element is referred to as being "directly coupled" or "directly connected" to other elements, there are no intervening elements present therebetween. Other expressions that explain the relationship between elements, such as "between," "directly between," "adjacent to," or "directly adjacent to," should be construed as being used herein in the same manner.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise", "include", "have", etc., when used herein, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

When a specific embodiment can be implemented in a different manner, functions or operations defined in a specific block may be performed differently from the sequence represented in a flowchart. For example, two consecutive blocks may be performed substantially simultaneously, or may be performed in inverse sequence, depending on related functions or operations.

The present disclosure is proposed to overcome a performance bottleneck problem related to a stored procedure control flow, such as generation of a duplicate instruction within a branch or sequential processing of every iteration in a loop, occurring during execution of a stored procedure in a database system.

In this regard, the present disclosure provides a stored procedure optimization method. The method optimizes a stored procedure by converting a query execution plan into an intermediate representation (IR) by applying just-in-time (JIT) compilation to a stored procedure, optimizing an execution plan by applying optimization rules specialized for branches and loops, and generating and executing a query executor complied with up-to-date machine codes.

The stored procedure optimization method proposed in the present disclosure can be widely used in general database system supporting online analysis workload using a stored procedure.

Hereinafter, a stored procedure optimization method and system according to exemplary embodiments will be described in detail with reference to the accompanying drawings.

Figure 1:
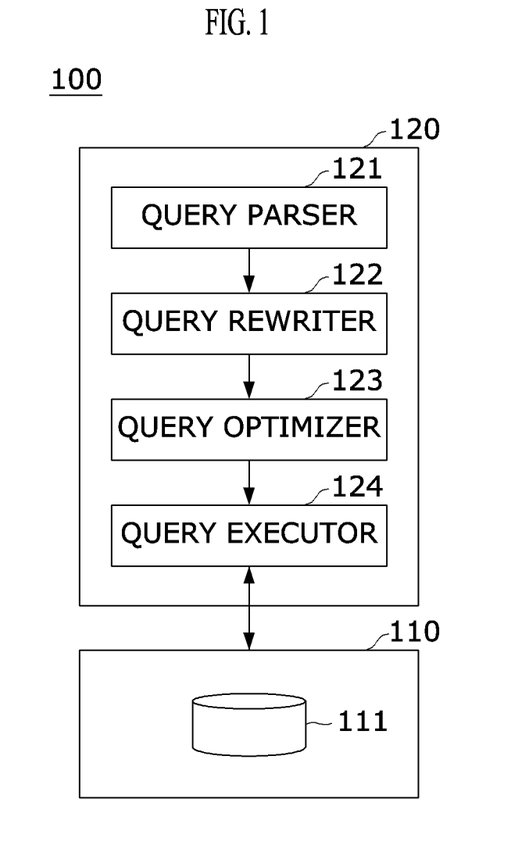
FIG. 1 is a block diagram illustrating a general structure of an interpreted database system of the related art.

FIG. 1 is a block diagram illustrating a general structure of an interpreted database system of the related art.

Referring to FIG. 1, the database system 100 generally includes a storage manager 110 and a query processor 120.

The storage manager 110 manages data in a disk or storage and provides the query processor 120 with an access method for the data managed in the disk or storage, while the query processor 120 processes a user input query using the access method provided by the storage manager 110 and provides a result to the user.

For execution of a function, each of the storage manager 110 and the query processor 120 may include at least one processor and at least one storage.

Functionally, the storage manager 110 manages data stored on a disk or storage 111 and provides data to the query processor 120, in response to a data request from the query processor 120.

The query processor 120 includes a query parser 121, a query rewriter 122, a query optimizer 123, and an interpreted query executor 124. The query parser 121 parses a user query for an online transaction processing (OLTP) query, an online analytical processing (OLAP) analysis, or a stored procedure. The query rewriter 122 rewrites an abstract syntax tree, or a result of parsing, into an executable execution plan. The query optimizer 123 converts the execution plan into an optimized form. The interpreted query executor 124 executes query processing while traversing an optimized execution plan tree in a top-down manner, generates a result of query processing in a bottom-up manner, and sends the result of query processing.

When an execution plan is encountered, the interpreted query executor 124 calls for a function of processing (e.g. a join( ) function in the case of a join node), depending on the type of each node (i.e. type of each operator) indicating an operator, while traversing from a root node to a terminal node.

The called function sequentially executes functions of lower nodes and is sequentially provided with results thereof in order to generate a result of the corresponding node. In this processing method, a plurality of functions are called for, and function calling is frequent. It is difficult to use a pipeline processing function, a register/cache, or the like, provided by a current central processing unit (CPU). In addition, parallel processing is impossible, due to single-tuple processing.

Accordingly, even in the case that up-to-date hardware is used, an improvement in the performance of the database system is limited, since the database system processes a query based on an interpreter model.

Figure 2:
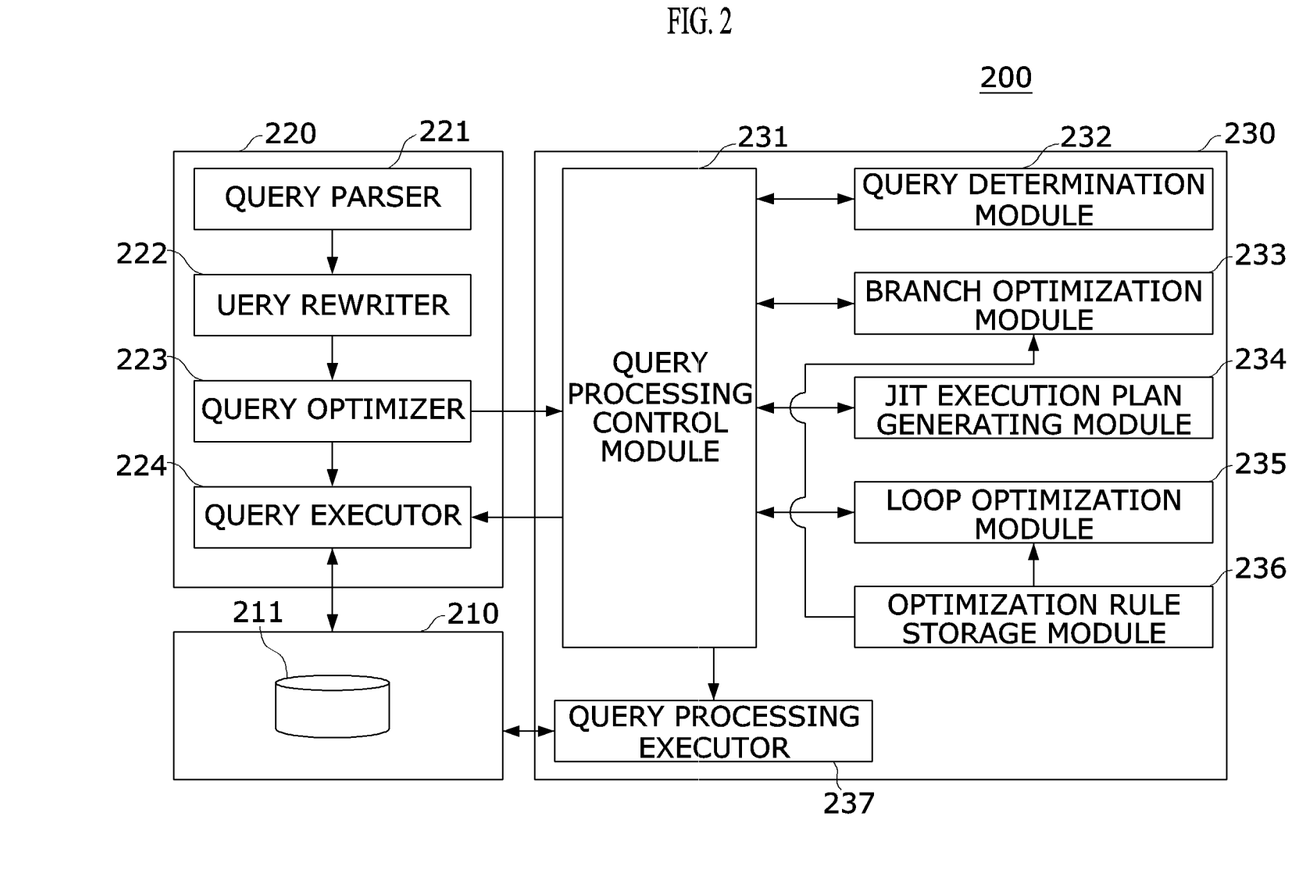
FIG. 2 is a block diagram illustrating a structure of a JIT compilation-based database system according to an exemplary embodiment.

FIG. 2 is a block diagram illustrating a structure of a JIT compilation-based database system according to an exemplary embodiment.

Referring to FIG. 2, the database system 200 according to an exemplary embodiment includes a storage manager 210, an interpreted query processor 220, and a JIT-based query processor 230.

The storage manager 210 manages data stored on a disk or storage 211, and in response to a data request from the interpreted query processor 220 or the JIT-based query processor 230, provides requested data to the corresponding processor 220 or 230.

A detailed description of the interpreted query processor 220 will be omitted, since the interpreted query processor 220 is configured in the same manner as the interpreted query processor 120 based on an interpreter model illustrated in FIG. 1.

The interpreted query processor 220 may include at least one processor executing functions, at least one memory storing algorithms (or programs) required for execution of functions and a result of execution of the function, a communications module for communicating with an external device, and the like.

The interpreted query processor 220 generates a structured query language (SQL) execution plan by performing statement analysis, query conversion, and SQL optimization, regarding an input OLTP query, an OLAP analysis, and a stored procedure, using an SQL parsing function and an execution plan generating function.

The stored procedure may be comprised of a plurality branches and a plurality of overlappable loops (e.g. nested loops).

In addition, the interpreted query processor 220 inputs the generated SQL execution plan to the JIT-based query processor 230.

The JIT-based query processor 230 may include at least one processor executing functions, at least one memory storing algorithms (or programs) required for execution of functions and results of execution of operations, and a communications module for communicating with an external device.

The JIT-based query processor 230 determines whether or not the SQL execution plan, input from the interpreted query processor 220, is a query subjected to JIT compilation and, when the input SQL execution plan is not a query subjected to JIT compilation, provides a processing command to the interpreted query processor 220 to perform interpreted query processing.

In addition, when the input SQL execution plan is a query subjected to JIT compilation, the JIT-based query processor 230 performs JIT compilation on the input SQL execution plan and optimizes the branches and loops before query processing.

Specifically, the JIT-based query processor 230 may include a query processing control module 231, a query determination module 232, a branch optimization module 233, a JIT execution plan generating module 234, a loop optimization module 235, and an optimization rule storage module 236.

The query processing control module 231 controls overall operations of the JIT-based query processor 230, so that JIT-based query processing can be performed.

In particular, the query processing control module 231 provides the SQL execution plan, input from the interpreted query processor 220, to the query determination module 232.

In addition, when the determination result indicating that the SQL execution plan, input from the interpreted query processor 220, is not a query subjected to JIT compilation is received from the query determination module 232, the query processing control module 231 requests that the interpreted query processor 220 perform query processing.

In addition, the query processing control module 231 generates a query processing executor 237. The query processing executor 237 processes the query based on a generated JIT execution plan and provides a result of query processing to the user.

Here, the query processing control module 231 generates the query processing executor 237 so that the query processing executor 237 can transmit and receive data by working in concert with the storage manager 210, while the query processing executor 237 performs the query by converting the JIT execution plan into machine codes.

In addition, the query processing control module 231 transmits and receives information to and from other modules (e.g. 233, 234, and 235) in the JIT-based query processor 230.

The query determination module 232 analyzes the SQL execution plan, received from the query processing control module 231, to determine whether or not the SQL execution plan is a query subjected to JIT compilation and provides a result of determination to the query processing control module 231.

Here, the query determination module 232 determines whether the SQL execution plan is an OLTP query or an OLTP analysis by performing a query workload analysis to the SQL execution plan and, when the SQL execution plan is the OLTP analysis, determines the SQL execution plan to be a query subjected to JIT compilation.

When both an analytic function and an aggregate function are used, the query determination module 232 determines the SQL execution plan to be an OLAP analysis. Otherwise, the query determination module 232 predicts query selectivity and, when the query selectivity does not exceed a threshold value, determines the SQL execution plan to be an OLAP analysis. The threshold value used here may be variably selected by experiments.

In contrast, when none, or one, of the analytic function and the aggregate function is used and the query selectivity exceeds the threshold value, the query determination module 232 determines the SQL execution plan to be an OLTP query.

The branch optimization module 233 executes optimization to branches in the SQL execution plan, received from the query processing control module 231, and provides the branch-optimized SQL execution plan as a result of execution to the query processing control module 231.

The JIT execution plan generating module 234 generates a JIT execution plan by converting the SQL execution plan, received from the query processing control module 231, into the JIT execution plan, in the form of an intermediate representation (IR), and provides the generated JIT execution plan to the query processing control module 231.

For example, the SQL execution plan in the IR form is composed by calling of a plurality of low-level operator functions.

For example, while each of the operator functions is being managed in the form of an IR after having already been converted into the IR, comprehensive optimization may be undertaken by converting operator functions in the SQL execution plan into corresponding IRs and connecting the converted IRs to the JIT execution plan by an optimization method.

For example, the IRs according to the present disclosure may be IR statements of a low-level virtual machine (LLVM), which is an open source project, so that a variety of SQL queries can be expressed as low-level representations that are platform-independent (low-level platform-independent representations) and a variety of optimization methods can be used.

IRs are converted into optimized IRs when subjected to optimization and are finally converted into platform-dependent machine codes, which are to be subjected to execution.

The loop optimization module 235 executes optimization to loops in the JIT execution plan, received from the query processing control module 231, and provides the loop-optimized JIT execution plan as a result of execution to the query processing control module 231.

The optimization rule storage module 236 stores optimization rules required for the branch optimization module 233 and the loop optimization module 235 to perform optimization functions.

Regarding basic procedure statements in the SQL execution plan, the JIT execution plan generating module 234 generates the JIT execution plan by generating general function call statements.

In addition, regarding branches and loops in the SQL execution plan, the JIT execution plan generating module 234 generates the JIT execution plan using conditional/unconditional branches between basic blocks, i.e. bundles of instructions.

Branches and loops in the SQL execution plan are represented using four symbols, including BARRIER, LEAVE, REDO, and EXIT.

Branches are comprised of a BARRIER conditional statement for examining entry into a barrier from the outside of the barrier (i.e. movement into the barrier) and an EXIT statement for determining exit from the barrier.

Loops are comprised of a BARRIER conditional statement for examining entry into a barrier from the outside of the barrier (i.e. movement into the barrier), a LEAVE conditional statement for examining exit from the inside of the barrier (i.e. movement to EXIT), a REDO conditional statement for movement to the head of the barrier, and an EXIT statement for determining final exit from the barrier.

Table 1 represents an example in which branches in an SQL execution plan are generated as a JIT execution plan, in the stored procedure optimization based on JIT compilation according to exemplary embodiments, while Table 2 represents an example in which loops in an SQL execution plan are generated as a JIT execution plan, in the stored procedure optimization based on JIT compilation according to exemplary embodiments.

TABLE 1

| SQL Execution Plan | JIT Execution Plan |
| --- | --- |
| BARRIER X1 = Condition<br>Command1<br>Command2<br>EXIT1 | %1 = call i1 checkTrue(stk, pci)<br>Bri1 %1, label Barrier, label exit<br><br>Barrier:<br>  Command1<br>  Command2<br>  Br label exit<br>Exit: |

TABLE 2

| SQL Execution Plan | JIT Execution Plan |
| --- | --- |
| BARRIER X1 = True<br>  LEAVE X1 = Condition<br>  Command1<br>  Command2<br>  REDO X1 = True<br>EXIT1 | %1 = call i1 checkTrue(stk, pci)<br>Bri1 %1, label Barrier, label exit<br><br>Barrier:<br>  %2 = call i1 checkTrue(stk, pci)<br>  Br i1 %2, label leave, label exit<br>Leave:<br>  Command1<br>  Command2<br>  %3 = call i1 checkTrue(stk, pci)<br>  Br i1 %3, label barrier, label exit<br>Exit: |

As represented in Tables 1 and 2, the stored procedure optimization based on JIT compilation according to exemplary embodiments can be realized using control flow branch optimization rules and control flow loop optimization rules, which are applicable to an execution plan (i.e. the SQL execution plan or the JIT execution plan) representing branches and loops.

The configuration and functions of the stored procedure optimization system based on JIT compilation according to exemplary embodiments have been described hereinabove. Hereinafter, a stored procedure optimization system based on JIT compilation according to exemplary embodiments will be described with reference to FIG. 3.

Figure 3:
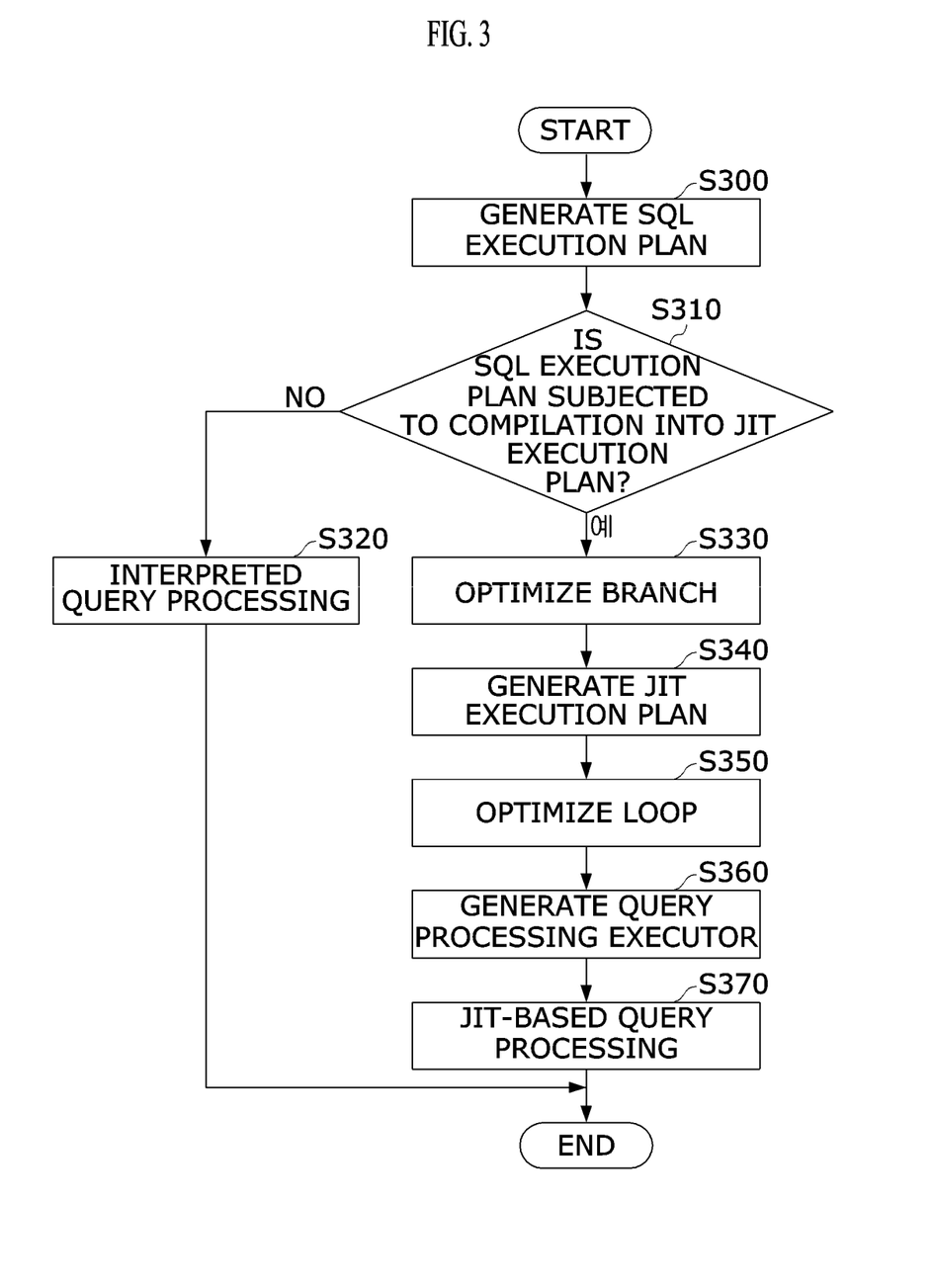
FIG. 3 is a flowchart illustrating operations in the stored procedure optimization system based on JIT compilation according to exemplary embodiments.

FIG. 3 is a flowchart illustrating operations in the stored procedure optimization system based on JIT compilation according to an exemplary embodiment.

The operations illustrated in FIG. 3 can be executed by the database system 200 illustrated in FIG. 2. In step S300, the interpreted query processor 220 generates an SQL execution plan regarding an input query, an OLAP analysis, and a stored procedure.

The SQL execution plan, generated by the interpreted query processor 220 in step S300, is provided to the JIT-based query processor 230.

In step S310, the JIT-based query processor 230 determines whether or not the SQL execution plan, received from the interpreted query processor 220, is supposed to be compiled into a JIT execution plan.

When the SQL execution plan is determined to not be compiled into a JIT execution plan in step S310 (in the case of NO in step S310), in step S320, the JIT-based query processor 230 requests that the interpreted query processor 220 performs query processing, and the interpreted query processor 220 performs interpreted query processing and provides a result of the interpreted query processing.

When the SQL execution plan is determined to be compiled into a JIT execution plan in step S310 (in the case of YES in step S310), in step S330, the JIT-based query processor 230 performs branch optimization when the SQL execution plan includes a branch.

When the SQL execution plan includes no branch or after the branch optimization is performed, in step S340, the JIT-based query processor 230 generates a JIT execution plan by converting the SQL execution plan or the branch-optimized SQL execution plan.

Afterwards, in step S350, the JIT-based query processor 230 performs loop optimization when the generated JIT execution plan includes a loop.

Subsequently, in step S360, the JIT-based query processor 230 generates a query processing executor to perform query processing based on the JIT execution plan or the loop-optimized JIT execution plan. In step S370, the query processing executor performs JIT-based query processing by converting the JIT execution plan or the loop-optimized JIT execution plan into machine codes and provides a result of the JIT-based query processing.

Hereinafter, the stored procedure optimization based on JIT compilation according to exemplary embodiments will be described in more detail, in relation to a process of optimizing a stored procedure using "control flow branch optimization rules" and "control flow loop optimization rules."

Control Flow Branch Optimization Rules

First, control flow branch optimization rules used in the stored procedure optimization based on JIT compilation according to exemplary embodiments will be described.

Control flow branch optimization is an optimization method applicable to a bundle of branches for performing a plurality of selective operations depending on the value of a branch condition variable of one of branches represented in the stored procedure.

Although a specific branch among the bundle of branches may be performed depending on the value of the branch condition variable, entire instructions of the entire branches must be generated since it is impossible to predict which branch will be performed.

Thus, the number of entire instructions of the JIT execution plan is increased. Consequently, a time for generating machine codes is sharply increased with increases in the number of the instructions of the JIT execution plan, which is problematic.

Table 3 illustrates an embodiment in which duplicate operations occur in an execution plan for branches of a stored procedure.

TABLE 3

| | |
|---|---|
| Stored procedure | IF (type = 1) THEN<br>    UPDATE air SET pm10_clusterId =<br>        (SELECT_clusterId FROM ar WHERE ar.id = air.id);<br>END IF;<br>IF (type = 2) THEN<br>    UPDATE air SET no2_clusterId =<br>        (SELECT_clusterId FROM ar WHERE ar.id = air.id);<br>END IF;<br>IF (type = 3) THEN<br>    UPDATE air SET o3_clusterId =<br>        (SELECT_clusterId FROM ar WHERE ar.id = air.id);<br>END IF; |
| SQL Execution Plan | barrier X_1 := calc. == (Atype,1)<br>    ... Same 47 Instructions ...<br>sql.update(X_1021:int,"sys":str,"air":str,"pm10_clusterid":str,<br>    X_1068:bat[:oid,:oid],X_1085:bat[:oid,:int]);<br>exit X_1<br>barrier X_2 := calc. == (Atype,2)<br>    ... Same 47 Instructions ...<br>sql.update(X_01090:int,"sys":str,"air":str,"no2_clusterid":str,<br>    X_1137:bat[:oid,:oid],X_1154:bat[:oid,:int]);<br>exit X_2<br>barrier X_3 := calc. == (Atype,3) |

TABLE 3-continued

```
      ... Same 47 Instructions ...
    sql.update(X_1159:int,"sys":str,"air":str,"o3_cluste
    rid":str,
              X_1207:bat[:oid,:oid],X_1224:bat[:oid,:int]);
    exit X_3
```

Referring to the stored procedure in Table 3, the stored procedure includes a single update in a branch. The update is comprised of a total of forty eight (48) SQL instructions when converted into an SQL execution plan.

Field names (pm10_clusterId, no2_clusterId, and o3_clusterId), modified by the value of a type branch condition variable, are determined. Among the forty eight instructions of the SQL execution plan, the last instruction is a unique instruction, and the forty seven instructions are represented as being duplicate in other branches.

Thus, the stored procedure maintains duplication in the same manner even when converted into the JIT execution plan. This, however, increases the number of instructions to be compiled at the event of JIT compilation of the JIT execution plan into machine codes, thereby increasing the time of JIT compilation, which is problematic.

Table 4 represents an embodiment in which an SQL execution plane, as represented in Table 3, is optimized by control flow branch optimization rules applied thereto.

TABLE 4

| | |
|---|---|
| SQL Execution Plan | barrier X_1 := calc. == (Atype,1)<br>... Same 47 Instructions ...<br>sql.update(X_1021:int,"sys":str,"air":str,"pm10_clus terid":str,<br>    X_1068:bat[:oid,:oid],X_1085:bat[:oid,:int]);<br>exit X_1<br>barrier X_2 := calc. == (Atype,2)<br>... Same 47 Instructions ...<br>sql.update(X_1090:int,"sys":str,"air":str,"no2_clust erid":str,<br>    X_1137:bat[:oid,:oid],X_1154:bat[:oid,:int]);<br>exit X_2<br>barrier X_3 := calc. == (Atype,3)<br>... Same 47 Instructions ...<br>sql.update(X_1159:int,"sys":str,"air":str,"o3_cluste rid":str,<br>    X_1207:bat[:oid,:oid],X_1224:bat[:oid,:int]);<br>exit X_3 |
| Optimized SQL Execution Plan | ... Same 47 Instructions ...<br>barrier X_1 := calc.==(Atype,1)<br>sql.update(X_1021:int,"sys":str,"air":str,"pm10_clus terid":str,<br>    X_1068:bat[:oid,:oid],X_1085:bat[:oid,:int]);<br>exit X_1<br>barrier X_2 := calc.==(Atype,2)<br>sql.update(X_1090:int,"sys":str,"air":str,"no2_clust erid":str,<br>    X_1137:bat[:oid,:oid],X_1154:bat[:oid,:int]);<br>exit X_2<br>barrier X_3 := calc.==(Atype,3)<br>sql.update(X_1159:int,"sys":str,"air":str,"o3_cluste rid":str,<br>    X_1207:bat[:oid,:oid],X_1224:bat[:oid,:int]);<br>exit X_3 |

As apparent from Table 4, when control flow branch optimization rules are applied to the embodiment illustrated in FIG. 3, duplicate instructions in three barrier/exit blocks, dependent on the same branch condition variable, are moved to the head of the entire barrier/exit blocks, and the SQL execution plan is optimized such that only an instruction, which is to be undertaken differently depending on the branch condition variable in each of the three barrier/exit blocks, is performed.

Patterns of duplicate instructions and unique instructions, occurring depending on the branch, may be defined, as represented in Table 5.

TABLE 5

| Pattern | Characteristics |
|---|---|
| Head Common | All duplicate instructions are located in the head of barrier/exit block |
| Middle Common | All duplicate instructions are located in the middle of barrier/exit block |
| Tail common | All duplicate instructions are located in the tail of barrier/exit block |
| Mixed Common | All duplicate instructions are located at any position in the middle of barrier/exit block |

Hereinafter, the control flow branch optimization will be described, according to the patterns of the branch operations represented in Table 5.

In the case of Head Common pattern, duplication is removed by moving duplicate instructions to the head of entire barrier/exit blocks, and unique instructions are located within the barrier/exit blocks.

In addition, when each of unique instructions refers to a result variable of the duplicate instructions as a factor, the pattern is modified such that an instruction that has been moved to the head of the entire barrier/exit blocks is referred to.

In the case of Middle Common pattern, the entire barrier/exit blocks are divided into two blocks. First unique instructions are located in the first barrier/exit block, while second unique instructions are located in the second barrier/exit block.

In addition, duplication is removed by locating the duplicate instructions between the first barrier/exit block and the second barrier/exit block.

In this case, when a duplicate instruction refers to a result of a unique instruction in the first barrier/exit block, entire result variables of the unique instructions in the first barrier/exit are changed to be the same, and the pattern is modified such that the duplicate instruction refers to a corresponding result variable.

In addition, when a unique instruction in the second barrier/exit block refers to a result variable of either a unique instruction in the first barrier/exit block or a duplicate instruction, the pattern is modified such that the result variable is referred to according to the moved position.

In the case of Tail Common pattern, unique instructions are located within the barrier/exit blocks, and duplication is removed by moving duplicate instructions to the tail of the entire barrier/exit blocks.

In this case, when a duplicate instruction refers to a result of a unique instruction in the leading barrier/exit block, entire result variables of the unique instructions in the leading barrier/exit block are set to be the same, and the pattern is modified such that the duplicate instruction refers to a corresponding result variable.

In the case of Mixed Common pattern, optimization is performed using another pattern optimization method.

Tables 6 to 9 represent embodiments of the SQL execution plan optimized by the control flow branch optimization, according to the duplicate/unique instruction pattern of stored procedure branches.

Table 6 represents an exemplary SQL execution plan in the case in which Head Common pattern of a stored procedure branch is optimized by the control flow branch optimization, Table 7 represents an exemplary SQL execution plan in the case in which Middle Common pattern of a stored procedure branch is optimized by the control flow branch optimization, and Table 8 represents an exemplary SQL execution plan in the case in which Tail Common pattern of a stored procedure branch is optimized by the control flow branch optimization.

TABLE 6

| SQL Execution Plan | Optimized SQL Execution Plan |
| --- | --- |
| barrier X_1 :=<br>calc.==(Atype,1)<br>... Common Instructions ...<br>* Distinct Instructions *<br>exit X_1 | ... Common Instructions ...<br>barrier X_1 :=calc.==(Atype,1)<br>* Distinct Instructions *<br>exit X_1 |

TABLE 7

| SQL Execution Plan | Optimized SQL Execution Plan |
| --- | --- |
| barrier X_1 :=<br>calc.==(Atype, 1)<br>* Distinct Instructions 1*<br>... Common Instructions ...<br>* Distinct Instructions 2*<br>exit X_1 | barrier X_1 :=<br>calc.==(Atype,1)<br>* Distinct Instructions 1*<br>exit X_1<br>... Common Instructions ...<br>barrier X_1 :=<br>calc.==(Atype,1)<br>* Distinct Instructions 2*<br>exit X_1 |

TABLE 8

| SQL Execution Plan | Optimized SQL Execution Plan |
| --- | --- |
| barrier X_1 :=<br>calc.==(Atype,1)<br>* Distinct Instructions *<br>... Common Instructions ...<br>exit X_1 | barrier X_1 :=<br>calc.==(Atype,1)<br>* Distinct Instructions *<br>exit X_1<br>... Common Instructions ... |

Figure 4:
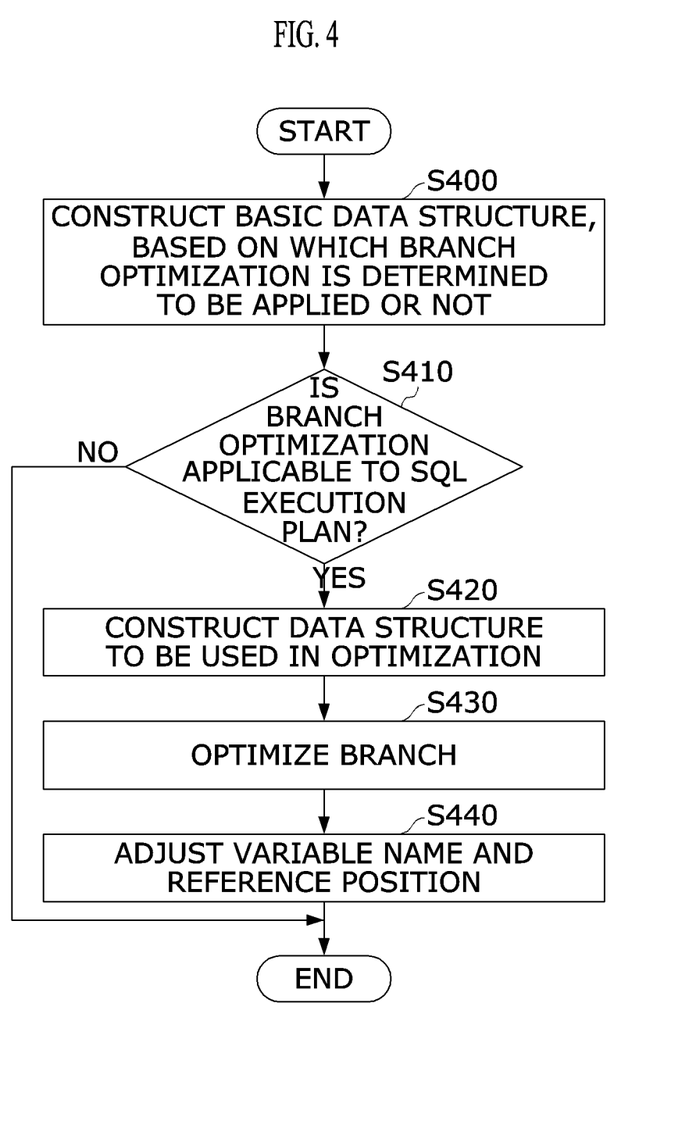
FIG. 4 is a flowchart illustrating a process of executing branch optimization rules according to an exemplary embodiment.

FIG. 4 is a flowchart illustrating a process of executing branch optimization rules according to an exemplary embodiment.

The branch optimization process illustrated in FIG. 4 may be executed by the branch optimization module 233 of the JIT-based query processor 230.

Referring to FIG. 4, in step S400, the branch optimization module 233 constructs a basic data structure (e.g. control flow information, branch information, branch block information, etc.), based on which branch optimization is determined to be applicable or not.

In step S400, the control flow information is used to manage a list of branch information, SQL execution plan information, and the like. The branch information is used to manage a list of two or more successive branches having the same branch condition variable, branch condition variables, and the like. The branch block information is used to manage information regarding individual branches in the branch information as branch part information.

After step S400, in step S410, the branch optimization module 233 determines whether or not the branch optimization is applicable by analyzing the SQL execution plan.

When two or more successive branches having the same branch condition variable are present, the branch optimization module 233 determines that the branch optimization is applicable.

When the branch optimization is determined to not be applicable in step S410 (in the case of NO in step S410), the branch optimization module 233 terminates the branch optimization.

When the branch optimization is determined to be applicable in step S410 (in the case of YES in step S410), in step S420, the branch optimization module 233 constructs a data structure (e.g. branch part information) to be used in the optimization.

The branch part information is generated in every branch block, for every bundle of duplicate/unique instructions in the branch block, with types of branch parts being categorized as 0 (common), 1 (distinct), and −1 (uninitialized).

After step S420, in step S430, the optimization module 233 performs optimization, based on information regarding the data structure.

Here, the optimization is undertaken by moving duplicate/unique operators to the head or tail, depending on the types of branch parts constructed in step S420 or positions thereof with respect to other branch parts.

After step S430, in step S440, the branch optimization module 233 adjusts a variable name and a reference position.

The adjustment is undertaken to the entire instructions such that no errors occur, in consideration of the original positions and moved positions of instructions, the positions of which are changed due to the optimization in step S430.

Control Flow Loop Optimization Rules

Hereinafter, control flow loop optimization rules used in the stored procedure optimization based on JIT compilation according to exemplary embodiments will be described.

A loop is a statement provided to repeatedly execute an internal procedure statement several times, depending on a result of examining the condition of a repetition condition variable.

A bundle of internal procedures repeatedly executed in a loop is referred to as an "iteration." The term "repetition" in the loop means that the iteration is continued until a specific condition is satisfied.

A loop representable using a stored procedure may be categorized as being subjected to parallel processing or not, depending on the sequence of iterations in the loop, the presence or absence of update, the presence or absence of overlapping, and the like, as represented in Table 2.

Table 9 represents categorization information of control flow loops according to an exemplary embodiment.

Control flow loop optimization rules according to an exemplary embodiment provide an optimization method intended to improve performance by performing operations of iterations in parallel for loops without dependency, without an update, and without a lower-level loop while sequentially executing iterations for other loops.

TABLE 9

| Feature | Category | Characteristics | Parallel processing |
| --- | --- | --- | --- |
| Sequence of iterations | Unordered | Loop without inter-iteration dependency | Allowerd |
| | Ordered | Loop having | Not allowerd |

TABLE 9-continued

| Feature | Category | Characteristics | Parallel processing |
|---|---|---|---|
| Update | Not included | inter-iteration dependency No iterative consistency error | Allowerd |
|  | Included | Iterative consistency error | Not allowerd |
| Overlap | Unnested | No lower-level loop in a loop | Determined based on the sequence of iterations and the presence of an update |
|  | Nested | Lower-level loop in a loop | Upper-level loop: Not allowerd Lower-level loop: Determined based on overlapping, the sequence of iterations, and the presence of an update |

Figure 5:
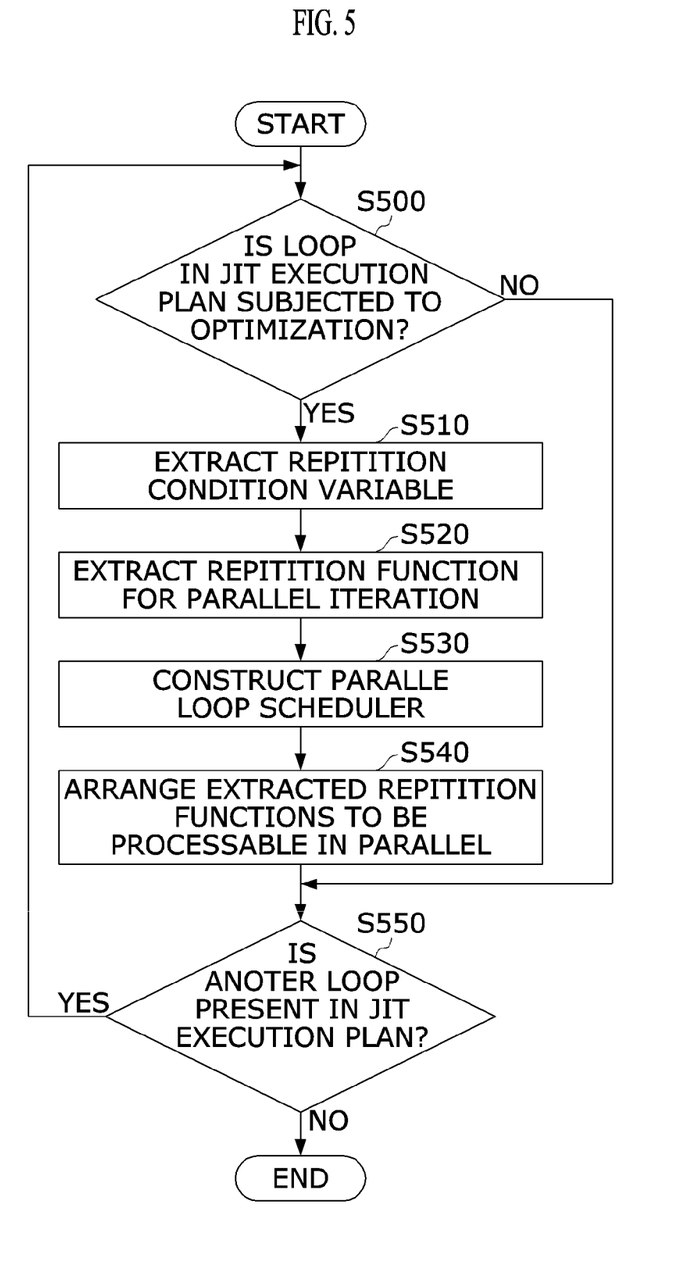
FIG. 5 is a flowchart illustrating a process of executing loop optimization rules according to an exemplary embodiment.

FIG. 5 is a flowchart illustrating a process of executing loop optimization rules according to an exemplary embodiment.

The loop optimization process illustrated in FIG. 5 can be performed by the loop optimization module 235 of the JIT-based query processor 230.

The loop optimization rules according to an exemplary embodiment provide an optimization method intended to perform parallel execution to internal procedure statements of a loop, which can be executed in parallel, using multiple threads. In this regard, the optimization method extracts five repetition functions, including checkLoopCond( ), checkRedoCond( ), checkLeaveCond( ), preparePartition( ), and processPartition( ), which can be threaded, by converting a JIT execution plan representable in the form of a single function, and controls the parallel execution of threads using a parallel loop scheduler in charge of scheduling control over the repetition functions.

Specifically, referring to FIG. 5, in step S500, the loop optimization module 235 determines whether or not a loop in a JIT execution plan is applicable to loop optimization rules, based on categorization information of control flow loops, as represented in Table 9.

Here, the loop optimization module 235 determines that none of a simple loop, a loop having inter-iteration dependency, a loop including an update, and a loop including a lower-level loop is to be optimized.

In contrast, the loop optimization module 235 determines that a loop without inter-iteration dependency, a loop without an update, and a loop without a lower-level loop are to be optimized.

After step S500, in step S510, the loop optimization module 235 examines and extracts a repetition condition variable in the loop.

In particular, in step S510, the loop optimization module 235 extracts update instruction information by examining a repetition condition variable about an instruction between a BARRIER statement and a LEAVE statement.

In addition, in step S510, the loop optimization module 235 extracts update instruction information by examining a repetition condition variable about an instruction between a LEAVE statement and a REDO statement.

After step S510, in step S520, the loop optimization module 235 extracts a repetition function for parallel iteration in the loop.

Here, the loop optimization module 235 may extract five repetition functions, including a checkLoopCond( ) function, a checkLeaveCond( ) function, a checkRedoCond( ) function, a processPartition( ) function, and a preparePartition( ) function, which can be threaded.

The checkLoopCond( ) function is a bundle of instructions for determining whether or not to enter the loop. The checkLeaveCond( ) function is a bundle of instructions for determining whether or not to exit the loop. The checkRedoCond( ) function is a bundle of instructions for determining whether or not to return to the beginning in the loop. The processPartition( ) function is a bundle of instructions for performing actual processing, modification, and retrieval of every iteration. The preparePartition( ) function is a bundle of instructions for updating the value of a repetition condition variable.

After step S520, in step S530, the loop optimization module 235 constructs a parallel loop scheduler that controls scheduling for the repetition functions extracted in step S520. In addition, in step S540, the loop optimization module 235 arranges the extracted functions such that the functions can be processed in parallel, using the constructed parallel loop scheduler.

In step S540, the parallel loop scheduler controls whether or not to perform the loop by performing the checkLoopCond( ) function, and then, determines whether or not to perform iterations by performing the checkLoopCond( ) function for each of the iterations.

In addition, when iteration or traversing is necessary, the parallel loop scheduler arranges loop body functions, comprised of the processPartition( ) function and the checkLoopCond( ) function, such that parallel processing is possible, by threading the loop body functions.

After threading, the checkRedoCond( ) function is performed to be prepared for examination of the next iteration condition. The parallel loop scheduler checks the loop until a result of the checkLoopCond( ) function is YES.

After step S540, in step S550, the loop optimization module 235 determines whether or not another loop is present in the JIT execution plan. When there is no other loop (in the case of NO in step S550), the loop optimization module 235 terminates the loop optimization. When there is another loop (in the case of YES in step S550), the loop optimization module 235 returns to step S500.

Although all components of the foregoing exemplary embodiments have been described as being combined together or operating together, the present disclosure is not limited thereto. Rather, one or more of all of the components may be selectively combined to operate together without departing from the scope or purpose of the present disclosure. In addition, all of the components may be implemented as an independent piece of hardware, but a portion or all of the components may be selectively combined to provide a computer program having a program module to perform a portion or all of the functions combined in one or a plurality of pieces of hardware. Furthermore, such a computer program may be stored in computer readable mediums, such as a universal serial bus (USB) memory, a compact disc read-only memory (CD-ROM), or a flash memory to be read and executed by a computer to implement the exemplary embodiments. Storage mediums for the computer program may include magnetic recording mediums, optical recording mediums, carrier waves, and so on.

Although the database system based on JIT compilation, the query processing method thereof, and the stored procedure optimization method thereof have been described with reference to the exemplary embodiments, the scope of the present disclosure should not be construed as being limited to these specific embodiments. A person skilled in the art to which the present disclosure relates could make a variety of alternatives, modifications, and alterations without departing from the scope of the present disclosure.

Therefore, the foregoing embodiments disclosed herein and the accompanying drawings shall be interpreted as illustrative, while not being limitative, of the principle and scope of the present disclosure. It should be understood that the scope of the present disclosure shall be defined by the appended Claims and all of their equivalents fall within the scope of the present disclosure.

What is claimed is:

1. A database system based on just-in-time (JIT) compilation, comprising:
    a storage manager managing data stored in a storage and providing data in response to a request;
    an interpreted query processor generating a structured query language (SQL) execution plan regarding an input online transaction processing (OLTP) query, an online analytical processing (OLAP) analysis, and a stored procedure; and
    a JIT-based query processor receiving the SQL execution plan, optimizing a branch and a loop in the received SQL execution plan, and then generating an optimized JIT execution plan, wherein the JIT-based query processor generates a query processing executor performing query processing based on the JIT execution plan and provides a result of the query processing performed by the query processing executor.

2. The database system according to claim 1, wherein the JIT-based query processor comprises:
    a query determination module determining whether or not the SQL execution plan is a query subjected to JIT compilation by analyzing the SQL execution plan;
    a branch optimization module optimizing the branch in the SQL execution plan;
    a JIT execution plan generating module generating the JIT execution plan by converting the SQL execution plan;
    a loop optimization module optimizing the loop in the input JIT execution plan;
    an optimization rule storage module storing optimization rules used by the branch optimization module and the loop optimization module to execute the optimization; and
    a query processing control module providing the SQL execution plan, received from the interpreted query processor, to the query determination module, receiving the JIT execution plan from the loop optimization module, and performing query processing to the received JIT execution plan.

3. The database system according to claim 2, wherein the query determination module determines whether the SQL execution plan is an OLTP query or an OLTP analysis by performing a query workload analysis to the SQL execution plan and, when the SQL execution plan is the OLAP analysis, determines the SQL execution plan to be the query subjected to the JIT compilation.

4. The database system according to claim 3, wherein the query determination module determines the SQL execution plan to be the OLAP analysis when both an analysis function and an aggregate function are used.

5. The database system according to claim 4, wherein, when none, or one, of the analysis function and the aggregate function is used, the query determination module predicts query selectivity and determines the SQL execution plan to be the OLAP analysis when the query selectivity does not exceed a threshold value.

6. The database system according to claim 2, wherein the query processing control module provides the SQL execution plan to the branch optimization module when the query determination module determines the SQL execution plan to be the query subjected to the JIT compilation and requests that the interpreted query processor performs interpreted query processing to the SQL execution plan when the query determination module determines the SQL execution plan to not be the query subjected to the JIT compilation.

7. The database system according to claim 2, wherein the query processing control module provides the branch-optimized SQL execution plan, received from the branch optimization module, to the JIT execution plan generating module, provides the JIT execution plan, received from the JIT execution plan generating module, to the loop optimization module, and when the loop-optimized JIT execution plan is received from the loop optimization module, generates the query processing executor.

8. The database system according to claim 2, wherein the branch optimization module performs:
    constructing a basic data structure, based on which branch optimization is determined to be applicable or not;
    determining whether or not the branch optimization is applicable by analyzing the SQL execution plan;
    when the branch optimization is determined to be applicable, constructing branch part information, based on which the branch optimization is applied;
    executing the branch optimization based on the branch part information; and
    adjusting a variable name and a reference position, in consideration of original positions and moved positions of instructions, which are moved as a result of the execution of the branch optimization.

9. The database system according to claim 8, wherein the branch optimization module executes the optimization by constructing a branch part in every branch block, for every bundle of duplicate instructions and every bundle of unique instructions in the branch block, categorizing a type of the branch part, and moving the duplicate operators and the unique operators to a head or a tail, depending on the type of the branch part or a position thereof with respect to another branch part.

10. The database system according to claim 2, wherein the loop optimization module performs:
    determining whether or not the loop in the JIT execution plan is a loop, to which loop optimization rules are applicable;
    when the loop optimization rules are applicable to the loop, extracting a repetition condition variable from the loop;
    extracting a repetition function for parallel iteration from the loop;
    generating a parallel loop scheduler in charge of scheduling control over the extracted repetition function; and
    arranging the extracted repetition functions to be processable in parallel using the parallel loop scheduler.

11. The database system according to claim 10, wherein, when the loop is a simple loop, a loop having inter-iteration dependency, a loop including an update, or a loop including a lower-level loop, the loop optimization module determines the loop in the JIT execution plan to not be subjected to the optimization, and when the loop is a loop without inter-iteration dependency, a loop without an update, or a loop without a lower-level loop, the loop optimization module determines the loop in the JIT execution plan to be subjected to the optimization.

12. The database system according to claim 10, wherein the loop optimization module extracts update instruction information by examining a repetition condition variable about an instruction between a BARRIER statement and a LEAVE statement and extracts update instruction information by examining a repetition condition variable about an instruction between the LEAVE statement and a REDO statement.

13. The database system according to claim 10, wherein the loop optimization module extracts a checkLoopCond( ) function, a checkLeaveCond( ) function, a checkRedoCond( ) function, a processPartition( ) function, and a preparePartition( ) function, which are threadable.

14. A query processing method of a database system based on just-in-time (JIT) compilation, the query processing method comprising:
  generating a structured query language (SQL) execution plan regarding an input online transaction processing (OLTP) query, an online analytical processing (OLAP) analysis, and a stored procedure;
  determining whether or not the SQL execution plan is subjected to compilation into a JIT execution plan;
  when the SQL execution plan is determined to not be subjected to the compilation into the JIT execution plan, performing interpreted query processing and providing a result of the interpreted query processing;
  when the SQL execution plan is determined to be subjected to the compilation into the JIT execution plan, optimizing a branch when the branch is determined to be present in the SQL execution plan;
  when the branch is determined to not be present in the SQL execution plan, converting the SQL execution plan into a JIT execution plan, and when the branch is optimized, converting the branch-optimized SQL execution plan into the JIT execution plan;
  when a loop is present in the JIT execution plan, optimizing the loop;
  generating a query processing executor performing query processing based on the JIT execution plan when the loop is absent in the JIT execution plan and performing query processing based on the loop-optimized JIT execution plan when the loop is optimized; and
  performing JIT-based query processing by converting the JIT execution plan or the loop-optimized JIT execution plan into machine codes using the query processing executor and providing a result of the JIT-based query processing.

15. The query processing method according to claim 14, wherein determining whether or not the SQL execution plan is subjected to the compilation into the JIT execution plan comprises determining whether or not the SQL execution plan is the OLTP query or the OLAP analysis and, when the SQL execution plan is the OLAP analysis, determining SQL execution plan to be subjected to the compilation into the JIT execution plan.

16. The query processing method according to claim 14, wherein optimizing the branch comprises:
  constructing a basic data structure, based on which branch optimization is determined to be applicable or not;
  determining whether or not the branch optimization is applicable by analyzing the SQL execution plan;
  when the branch optimization is determined to be applicable, constructing branch part information, based on which the branch optimization is applied;
  executing the branch optimization based on the branch part information; and
  adjusting a variable name and a reference position, in consideration of original positions and moved positions of instructions, which are moved as a result of the execution of the branch optimization.

17. The query processing method according to claim 14, wherein optimizing the loop comprises:
  determining whether or not the loop in the JIT execution plan is a loop, to which loop optimization rules are applicable;
  when the loop optimization rules are applicable to the loop, extracting a repetition condition variable from the loop;
  extracting a repetition function for parallel iteration from the loop;
  generating a parallel loop scheduler in charge of scheduling control over the extracted repetition function; and
  arranging the extracted repetition functions to be processable in parallel using the parallel loop scheduler.

18. A stored procedure optimization method of a database system based on just-in-time (JIT) compilation, the stored procedure optimization method comprising:
  optimizing a branch in a structured query language (SQL) execution plan generated by processing of an input online transaction processing (OLTP) query, an online analytical processing (OLAP) analysis, and a stored procedure;
  converting the branch-optimized SQL execution plan into a JIT execution plan;
  optimizing a loop in the JIT execution plan; and
  performing query processing by converting the loop-optimized JIT execution plan into machine codes.

19. The stored procedure optimization method according to claim 18, wherein optimizing the branch in the SQL execution plan comprises:
  constructing a basic data structure, based on which branch optimization is determined to be applicable or not;
  determining whether or not the branch optimization is applicable by analyzing the SQL execution plan;
  when the branch optimization is determined to be applicable, constructing branch part information, based on which the branch optimization is applied;
  executing the branch optimization based on the branch part information; and
  adjusting a variable name and a reference position, in consideration of original positions and moved positions of instructions, which are moved as a result of the execution of the branch optimization.

20. The stored procedure optimization method according to claim 18, wherein optimizing the loop in the JIT execution plan comprises:
  determining whether or not the loop in the JIT execution plan is a loop, to which loop optimization rules are applicable;
  when the loop optimization rules are applicable to the loop, extracting a repetition condition variable from the loop;
  extracting a repetition function for parallel iteration from the loop;
  generating a parallel loop scheduler in charge of scheduling control over the extracted repetition function; and
  arranging the extracted repetition functions to be processable in parallel using the parallel loop scheduler.

* * * * *